US011218937B2

(12) United States Patent
Pal et al.

(10) Patent No.: US 11,218,937 B2
(45) Date of Patent: Jan. 4, 2022

(54) METHOD AND SYSTEM FOR MANAGING USER APPLICATION LEVEL QUALITY-OF-SERVICE AWARE HANDOVER IN WIRELESS NETWORK

(71) Applicant: WIPRO LIMITED, Bangalore (IN)

(72) Inventors: Shyam Sundar Pal, Kolkata (IN); Swarup Mandal, Kolkata (IN)

(73) Assignee: Wipro Limited, Bangalore (IN)

( * ) Notice: Subject to any disclaimer, the term of this patent is extended or adjusted under 35 U.S.C. 154(b) by 22 days.

(21) Appl. No.: 16/835,116

(22) Filed: Mar. 30, 2020

(65) Prior Publication Data
US 2021/0306926 A1    Sep. 30, 2021

(30) Foreign Application Priority Data
Feb. 17, 2020  (IN) .............................. 202041006854

(51) Int. Cl.
| | | |
|---|---|---|
| *H04W 4/00* | (2018.01) | |
| *H04W 36/30* | (2009.01) | |
| *H04W 36/24* | (2009.01) | |
| *H04W 36/00* | (2009.01) | |
| *H04W 36/08* | (2009.01) | |
| *H04W 36/18* | (2009.01) | |

(52) U.S. Cl.
CPC ....... *H04W 36/30* (2013.01); *H04W 36/0044* (2013.01); *H04W 36/08* (2013.01); *H04W 36/18* (2013.01); *H04W 36/245* (2013.01)

(58) Field of Classification Search
CPC ... H04W 36/30; H04W 36/18; H04W 36/245; H04W 36/08; H04W 36/0044
USPC .......................................... 370/331; 455/312
See application file for complete search history.

(56) References Cited

U.S. PATENT DOCUMENTS

2011/0116468 A1*  5/2011  Zhu ................... H04W 36/0055
                                                            370/331

OTHER PUBLICATIONS

Kekki, S. et al., "MEC in 5G networks", ETSI 2018, pp. 1-28.

* cited by examiner

*Primary Examiner* — Marcos Batista
(74) *Attorney, Agent, or Firm* — Finnegan, Henderson, Farabow, Garrett & Dunner, LLP (57) ABSTRACT

Method and system for managing handover decisions while maintaining quality-of-service (QoS) of active user application sessions in a wireless network is disclosed. The method includes determining QoS requirement for each of the active user application sessions (UASs) based on user entitlements for relevant services associated with the active UASs, assessing the active UASs to determine instantaneous QoS level for each of the active UASs, and identifying impacted user equipment (UE) based on an overall QoS level for a set of active UAS, from among the active UASs, running on the impacted UE. The overall QoS level may be based on the instantaneous QoS level and the QoS requirement for each UAS in the set of active UAS. The method further includes managing a handover decision for the impacted UE based on a need for a handover of the impacted UE and a feasibility of the handover of the impacted UE.

19 Claims, 5 Drawing Sheets

METHOD AND SYSTEM FOR MANAGING USER APPLICATION LEVEL QUALITY-OF-SERVICE AWARE HANDOVER IN WIRELESS NETWORK

TECHNICAL FIELD

The present disclosure relates generally to wireless communication, and more particularly to method and system for managing handover decisions while maintaining quality-of-service (QoS) of active user application sessions in a wireless network.

BACKGROUND

Mobile devices have become ubiquitous in today's world and are increasingly used to access various services over wireless network. Over last few years, there has been a sharp rise in data consumption across the globe due to an increasing availability of smartphones. Increasingly, a user demand for an unparalleled data transfer experience is being met with a challenge for providing a seamless network connectivity.

A wireless network may include a number of base stations (BS's), each supporting communication for a number of mobile devices or user equipments (UE's). A networking signal is received from a first base station by a mobile device located in vicinity to the first base station. When the mobile device moves away from the vicinity of the first base station towards a second base station, a handover of the networking signal takes place. During the handover, the mobile device stops receiving the networking signal from the first base station and starts receiving the networking signal from the second base station. However, for the mobile device, a handover (HO) from the first base station to the second base station may temporarily disturb the network connectivity.

In a scenario, there may be a number of users in a coverage area for a base station. Each of the users may be using a number of application sessions associated with underlying service sessions. For example, if there are two applications of an Internet Protocol Multimedia Subsystem (IMS) and a General Packet Radio Service (GPRS) type used by a User Equipment (UE), an Application session level QoS ($A_{QoS}$) cannot be determined by the HO process. Possibly an identical value of Service level QoS ($S_{QoS}$) may be considered as the $A_{QoS}$ by the HO process since existing HO mechanism is at a service-session (Protocol Data Unit (PDU) session) level and not aware of the $A_{QoS}$ of individual application.

However, in reality, QoS requirement for individual application-sessions may be different. For example, the QoS requirement for the GPRS and the IMS application sessions may be different. During the HO of application sessions of the UE, if the second base station for individual application session is decided based on $S_{QoS}$, may lead to some of the individual application sessions in the second base station requiring resources and some other application session having an abundance of resources post-HO or may lead to application session interruption due to an unsuccessful HO. This may cause poor resource utilization and application session interruptions.

In the present state of art, a technology for a smooth HO does not exist. In order to cater to user specific service requirements, particularly in fifth generation (5G) wireless communication network, there is a need for providing a high data transfer rate and seamless network connectivity to maintain a Quality-of-Service (QoS) based on a User Application Session (UAS). It is therefore desirable to provide a technique which solves the above limitations of the prior art.

SUMMARY

In one embodiment, a method managing handover decisions while maintaining quality-of-service (QoS) of active user application sessions in a wireless network is disclosed. In one example, the method may include determining, by a source base station (SBS), a QoS requirement for each of a plurality of active user application sessions (UAS) based on a plurality of user entitlements for a plurality of relevant services associated with the plurality of active UAS. The method may further include assessing, by the SBS, the plurality of active UAS to determine an instantaneous QoS level for each of the plurality of active UAS. The method may further include, by the SBS, identifying an impacted user equipment (UE) based on an overall QoS level for a set of active UAS, from among the plurality of active UAS, running on the impacted UE. The overall QoS level may be based on the instantaneous QoS level and the QoS requirement for each UAS in the set of active UAS. The method may further include managing, by the SBS, a handover decision for the impacted UE based on a need for a handover of the impacted UE and a feasibility of the handover of the impacted UE to a target base station (TBS).

In another embodiment, a wireless network for managing handover decisions while maintaining quality-of-service (QoS) of active user application sessions is disclosed. In one example, the wireless network may include a SBS and a TBS, each communicatively coupled to a core network. The SBS is configured to determine a QoS requirement for each of a plurality of active user application sessions (UAS) based on a plurality of user entitlements for a plurality of relevant services associated with the plurality of active UAS. The SBS is further configured to assess the plurality of active UAS to determine an instantaneous QoS level for each of the plurality of active UAS. The SBS is further configured to identify an impacted user equipment (UE) based on an overall QoS level for a set of active UAS, from among the plurality of active UAS, running on the impacted UE. The overall QoS level may be based on the instantaneous QoS level and the QoS requirement for each UAS in the set of active UAS. The SBS is further configured to manage a handover decision for the impacted UE based on a need for a handover of the impacted UE and a feasibility of the handover of the impacted UE to the TBS.

In one embodiment, a non-transitory computer-readable medium storing computer-executable instructions for managing handover decisions while maintaining quality-of-service (QoS) of active user application sessions in a wireless network is disclosed. In one example, the stored instructions, when executed by a SBS, may cause the SBS to perform operations including determining a QoS requirement for each of a plurality of active user application sessions (UAS) based on a plurality of user entitlements for a plurality of relevant services associated with the plurality of active UAS. The operations may further include assessing the plurality of active UAS to determine an instantaneous QoS level for each of the plurality of active UAS. The operations may further include identifying an impacted user equipment (UE) based on an overall QoS level for a set of active UAS, from among the plurality of active UAS, running on the impacted UE. The overall QoS level may be based on the instantaneous QoS level and the QoS requirement for each UAS in the set of active UAS. The operations may further include managing a handover decision for the impacted UE based on a need for a handover of the impacted UE and a feasibility of the handover of the impacted UE to a TBS.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
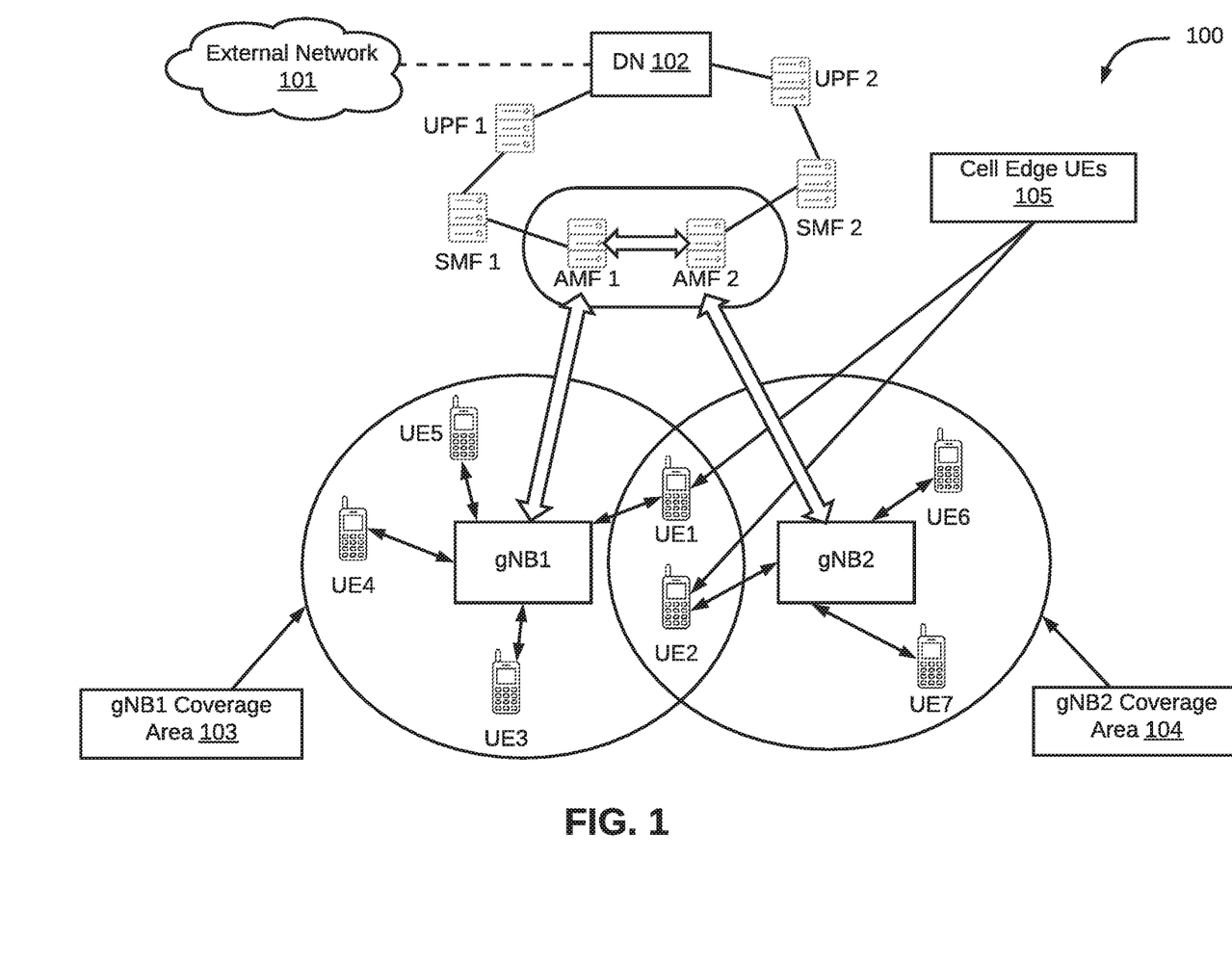
FIG. 1 illustrates an exemplary wireless communication network architecture in which various embodiments of the present disclosure may function.

Referring now to FIG. 1, an exemplary wireless communication network architecture in which various embodiments of the present disclosure may function is illustrated. By way of an example, the wireless communication network 100 (also, referred to as wireless network) may be Long Term Evolution (LTE) network or a next generation wireless communication network (i.e., 5G wireless network). The wireless network 100 may include an external network 101 communicatively coupled to a number of User Equipment (UEs) through a core network and an access network. By way of an example, the UEs may include UE1, UE2, UE3, UE4, UE5, UE6, and UE7. The core network may include a data network 102. The core network may further include a number of functional modules implemented by one or more servers. In some embodiments, the core network may include User Plane Functions, UPF1 and UPF2, interconnected with the DN 102. Further, the core network may include Session Management Functions, SMF1 and SMF2 interconnected with UPF1 and UPF2, respectively. The SMF1 and SMF2 may be interconnected with Access and Mobility Management Functions, AMF1 and AMF2, respectively. In some embodiments, the AMF1 may be interconnected with AMF2. It may be noted that the AMF1 and AMF2 may receive session requests from an access network. The access network may include one or more base stations (BS). In some embodiments, the BS may include next generation nodeBs (gNBs). It should be noted that each BS may receive session requests from one or more UEs within its coverage area.

For example, in the illustrated embodiment, the base stations gNB1 and gNB2 may each communicate with the UEs over a signal coverage area by sending/receiving networking signals. In such exemplary scenarios, the signal coverage area for gNB1 may be a gNB1 coverage area 103 and the signal coverage area for gNB2 may be a gNB2 coverage area 104. Further, there may be an interference region between the gNB1 coverage area 103 and the gNB2 coverage area 104. In some embodiments, cell edge UEs 105 may include some of the UEs (for example, UE1 and UE2), located in the overlap region (also referred to as interference region). It is important to effectively and efficiently manage handover decisions for these UEs (i.e., UE1 and UE2) between their source base station (SBS) (say, gNB1) and their target base station (TBS) (say, gNB2) while maintaining quality-of-service (QoS) of active user application sessions.

In some embodiments, the UE1 may move from the gNB1 coverage area 103 to the gNB2 coverage area 104. It may be noted that a handover (HO) of the networking signal for UE may be initiated from gNB1 (i.e., SBS) to gNB2 (i.e., TBS) in the access network. Further, the core network may be required to perform necessary orchestration of relevant services for an active service session continuity. It may be noted that the AMF1 and AMF2, along with a new-radio-interface (NR-I), may handle mobility management-related aspects of a RAN-UE in the wireless network 100. As will be appreciated, the AMF1 and AMF2 may perform a UE Service session control along with the SMF1 and SMF2 during the HO for a service session continuity.

It may be noted that the HO of the UE1 may take place based on a signal strength received from a UE measurement report. Further, the gNB1 may determine the HO based on the signal strength with respect to gNB2. In some embodiments, the HO may be based on the signal strength determined through network events such as A1, A2, A3, B1, B2, and the like. It may be noted that gNB1 may select a suitable target gNB (for example, gNB2) from a list of potential gNBs in vicinity of the UE, based on the network events. It may be noted that the HO mechanism described above may manage continuity of Protocol Data Unit (PDU) sessions only.

In some embodiments, a Policy Control Function (PCF) may apply relevant policies to PDU sessions associated with the plurality of UEs. By way of an example, the relevant policies may include the QoS entitlement for each of the PDU sessions. Further, the UE1 may initiate a bearer modification request to the network 101 through the gNB1, when QoS entitlement for a PDU session for the UE may be modified by the network 101. Further, the PCF may perform QoS change based on the bearer modification request from the UE1, by enforcing an associated policy. Further, at least one of the AMF1 and AMF2 may use the PCF for UE1 and at least one of the SMF1 and SMF2 may use the PCF for the PDU Session.

Typically, QoS is maintained by the following steps: receiving the bearer modification request (for QoS entitlement modification) by the PCF from the at least one of the AMF1 and AMF2, updating a PDU session level QoS entitlement by the PCF for the UE1 in a PCF repository, updating the at least one of the AMF1 and AMF2 (through the at least one of the SMF1 and SMF2) by the PCF for a QoS entitlement requirement for the PDU session, intimating gNB1 by the at least one of the AMF1 and AMF2 for the QoS entitlement requirement for the PDU session, performing required changes by the gNB1 in a scheduling mechanism for the PDU session, informing the at least one of the AMF1 and AMF2 about the required changes, sending the bearer modification request by the at least one of the AMF1 and AMF2 to the PCF (through the at least one of the SMF1 and SMF2) upon receiving a successful change message from the gNB1, and applying a set of PDU session management policy-rules on the at least one of the SMF1 and SMF2, appropriate for an updated QoS entitlement, upon receipt of the message from the at least one of the AMF1 and AMF2.

Further, as will be described in greater detail in conjunction with FIGS. 2-5, the wireless network 100 may manage handover decisions while maintaining QoS of active user application sessions, in accordance with some embodiments of the present disclosure. In particular, the SBS may determine a QoS requirement for each of a plurality of active user application sessions (UAS) based on a plurality of user entitlements for a plurality of relevant services associated with the plurality of active UAS. The SBS may further assess the plurality of active UAS to determine an instantaneous QoS level for each of the plurality of active UAS. The SBS may further identify an impacted UE based on an overall QoS level for a set of active UAS, from among the plurality of active UAS, running on the impacted UE. It may be noted that the overall QoS level is based on the instantaneous QoS level and the QoS requirement for each UAS in the set of active UAS. Further, SBS may manage a handover decision for the impacted UE based on a need for a handover of the impacted UE and a feasibility of the handover of the impacted UE to the TBS.

Figure 2:
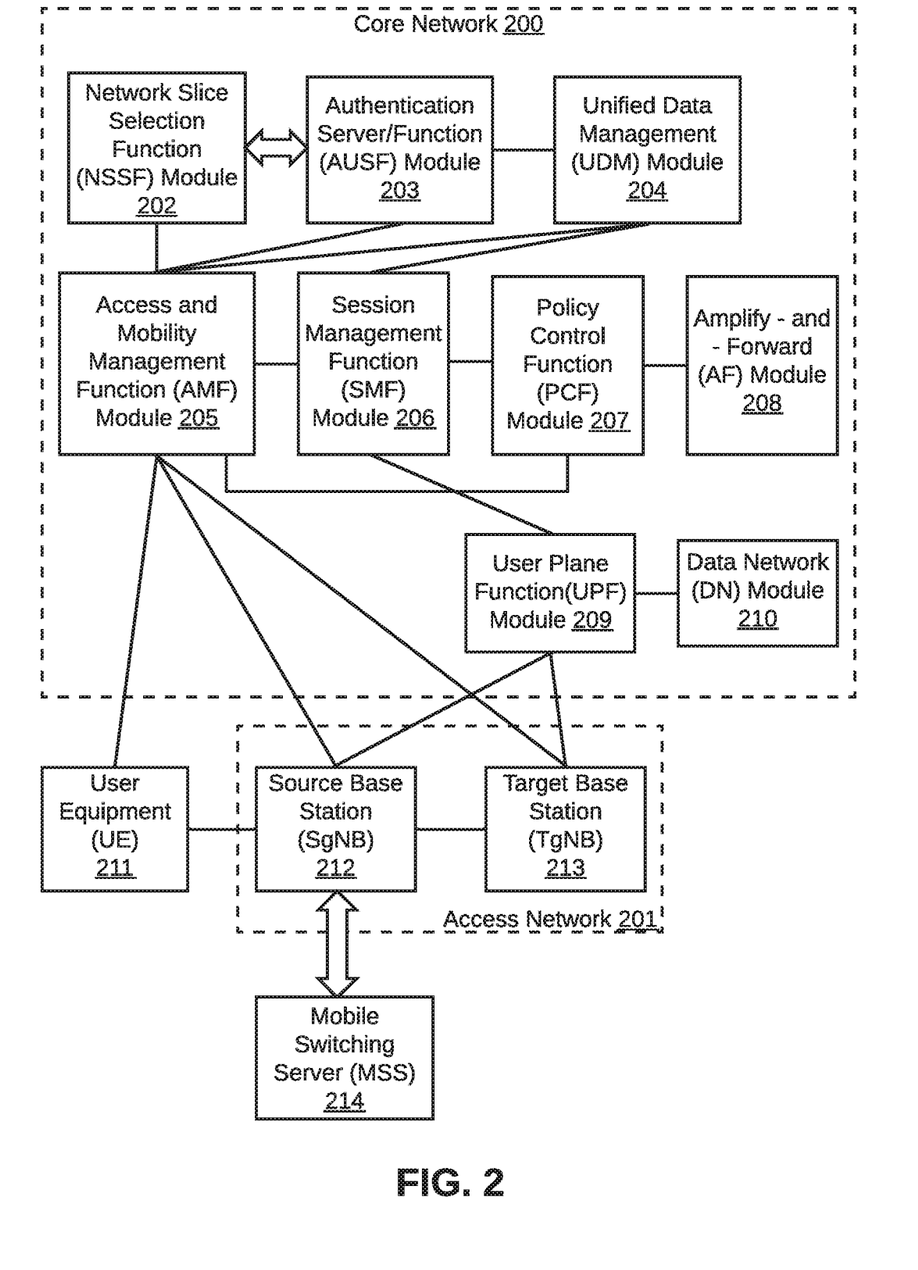
FIG. 2 is a functional block diagram of an exemplary core network, implemented by the exemplary wireless communication network of FIG. 1, for managing handover decisions while maintaining QoS of active user application sessions, in accordance with some embodiments of the present disclosure.

Referring now to FIG. 2, a functional block diagram of an exemplary core network 200, implemented by the wireless communication network 100 of FIG. 1, for managing handover decisions while maintaining QoS of active user application sessions is illustrated, in accordance with some embodiments of the present disclosure. The core network 200 may interact with a User Equipment (UE) 211 via an access network 201. The access network 201 may include a number of base stations including a source base station (SBS) and a target base station (TBS). Further, in some embodiments, the base station may be a next generation NodeB (gNB). Thus, in such embodiments, the access network may include a source gNB (SgNB) 212 and a target gNB (TgNB) 213.

The core network 200 may include a Network Slice Selection Function (NSSF) Module 202, a Authentication Server/Function (AUSF) Module 203, a Unified Data Management (UDM) Module 204, an Access and Mobility Management Function (AMF) Module 205, a Session Management Function (SMF) Module 206, a Policy Control Function (PCF) Module 207, an Amplify-and-Forward (AF) Module 208, a User Plane Function (UPF) Module 209, and a Data Network (DN) Module 210. Further, the core network 200 may include a Mobile Switching Server (MSS) 214.

It should be noted that all such aforementioned modules 202-210 may be represented as a single module or a combination of different modules. Further, as will be appreciated by those skilled in the art, each of the modules 201-210 may reside, in whole or in parts, on one device or multiple devices in communication with each other. In some embodiments, each of the modules 201-210 may be implemented as dedicated hardware circuit comprising custom application-specific integrated circuit (ASIC) or gate arrays, off-the-shelf semiconductors such as logic chips, transistors, or other discrete components. Each of the modules 201-210 may also be implemented in a programmable hardware device such as a field programmable gate array (FPGA), programmable array logic, programmable logic device, and so forth. Alternatively, each of the modules 201-210 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

The AMF module 205 may perform access and mobility functions of the core network 201. By way of an example, some of the functions related to mobility may be UE authentication and registration, UE data-path-switching across the set of gNBs during the HO, and the like. In an embodiment, the AMF module 205 may be implemented by at least one of the AMF1 and AMF2 of the wireless network 100. Typically, the AMF module 205 may obtain application-session information from the SMF module 206 when a new session is established. Additionally, in the present invention, the AMF module 205 may obtain a corresponding QoS information from the PCF module 207 when a new session is established.

The SMF module 206 may perform a task of session establishment and maintenance specific to the users. In an embodiment, the SMF module 206 may be implemented by at least one of the SMF1 and SMF2 of the wireless network 100. Further, the SMF module 206 may handle session information received for each UE from the base station (e.g., gNB). The SMF module 206 may establish session for each UE application in the core network 200. Typically, the SMF module 206 may obtain session information from the AMF module 205 when a new session is established. Additionally, in the present invention, the SMF module 206 may obtain a "PDUSession_UpdateSMContext Request" from the AMF module 205 for establishing the session. Further, in the present invention, the SMF module 206 may send a "Session Modification Request" to the UPF module 209 for establishing a context in data plane.

The PCF module 207 may perform a task for obtaining QoS information and enforcing QoS for an application for the UE 211. Further, the PCF module 207 may receive session specific information and a corresponding QoS requirement of each application from the SMF module 206. Typically, the PCF module 207 may also share QoS information post enforcement with the SMF module 206. Additionally, in the present invention, during the HO, the PCF module 207 may receive a "PolicyControl_Create Request" for policy association of applications in a target PCF module. It may be noted that the target PCF may be a PCF module corresponding to the TBS. Further, in response, the target PCF module may send a "PolicyControl_Create Response" to a target AMF module corresponding to the TBS, which may then forward the "PolicyControl_Create Response" to the AMF module 205. The PCF module 207 may then receive a "PolicyControl_Delete" from the AMF module 205 to delete a policy association. Further, the PCF module 207 may send a "PolicyControl_Delete Response" back to the AMF module 205 if deletion is successful.

The UPF module 209 may be used for data transfer—data received from external network in downlink direction and data received from the UE 211 in uplink direction, Typically, the UPF module 209 may send/receive uplink/downlink data to/from the data network module 210. Similarly, the UPF module 209 may receive/send uplink/downlink data from/to the UE 211. Additionally, in the present invention, during the HO, if the UPF is changed, the UPF module 209 may receive a path switch request message through the AMF module 205 in the core network 201.

The SgNB 212 may perform measurement control and configuration for measurement report. The measurement report and the measurement control report from the UE 211 may be received at the SgNB 212 for determining signal strength of the UE 211. Typically, the SgNB 212 decides the HO of the UE 211 to the TgNB 213 based on signal condition. However, in the present invention, the SgNB 213 may also consider application QoS parameters along with signal strength for deciding the HO. Additionally, the SgNB 212 may check if the QoS of a current application in the SgNB 212 may be maintained in the TgNB 213. Further, if the SgNB 212 decides for the HO for the UE 211, then the SgNB 212 may send a HO request to the MSS 214. The HO request ay include the QoS information of one or more applications running on the UE 211.

The TgNB 213 may receive a HO request from the SgNB 212. In the present invention, the TgNB 213 may also receive application related QoS information in a "Handover Request". Further, the TgNB 213 may check if the HO request may be fulfilled based on a current capacity and load. It should be noted that the application related QoS information may be considered in order to maintain the session with the required QoS.

As will be appreciated, various components of the core network 200 and the access network may include a variety of operational parameters. A Local Configuration (LC) of these parameters may include, but may not be limited to, a Threshold data service at the TgNB 213 ($QoSNBS_{th}$), a Handover Timer ($Timer_{handover}$), a Threshold RSRP ($RSRP_{th}$), a Threshold data at the SgNB 212 ($QoSSBS_{th}$), a Weight factor for RSRP ($RSRP_{weight}$), a Weight factor for Applications ($Appl_{weight}$). The $QoSNBS_{th}$ is a threshold value of the QoS of different types services. It may be noted that the $QoSNBS_{th}$ may be provided at the TgNB 213 after the HO. Further, if the aggregate QoS for different services may be above the threshold value then the HO may be triggered by the SgNB 212.

The $Timer_{handover}$ may be used to determine if a duration of QoS at the SgNB 212 falls below a threshold level and whether a corresponding Reference Signals Received Power (RSRP) falls below a threshold level. In some scenarios, when the duration is above the threshold timer then a HO triggering event is determined.

The $RSRP_{th}$ may be used to determine the HO triggering event. In some scenarios, when the RSRP in the measurement report may be below a threshold level, then after a waiting time of the $Timer_{handover}$, the HO may be triggered.

The $QoSSBS_{th}$ is a threshold value of the QoS of different types services provided at the SgNB 212. In some scenarios, when an aggregate QoS for different services is above the threshold value, then the HO is triggered by the SgNB 212.

The $RSRP_{weight}$ may be used to determine the TgNB 213 as a candidate for the HO. In some embodiments, the TgNB 213 may be selected for handover based on an aggregate result of handover criteria (Applications QoS, RSRP).

The $Appl_{weight}$ may be used to determine the TgNB 213 as a candidate for the HO. The $Appl_{weight}$ is determined based on the QoS on each application. In some embodiments, the TgNB 213 may be selected for handover based on an aggregate result of handover criteria (Applications QoS, RSRP).

Figure 3:
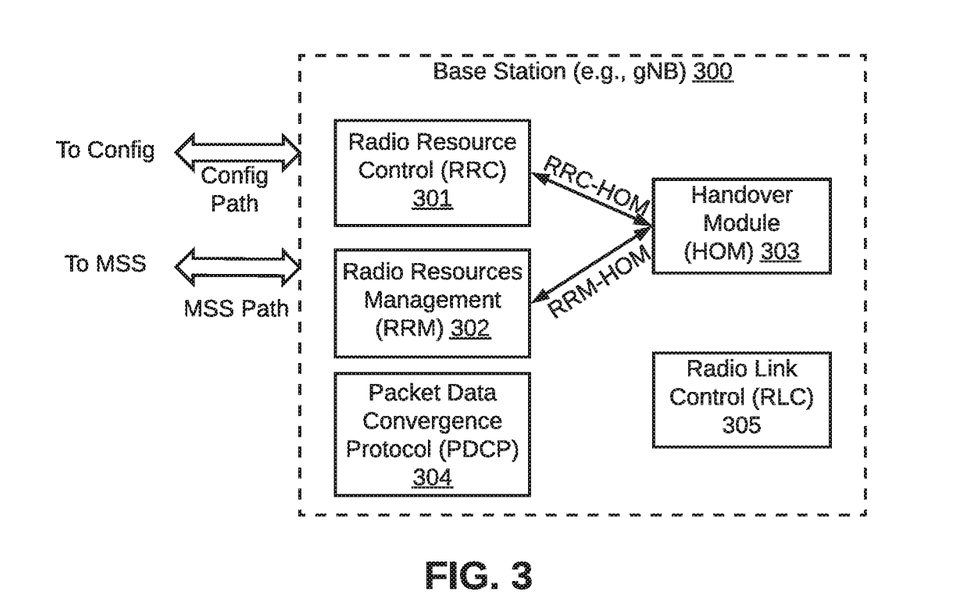
FIG. 3 is a functional block diagram of an exemplary base station implemented by the exemplary wireless communication network of FIG. 1, for managing handover decisions while maintaining QoS of active user application sessions, in accordance with some embodiments of the present disclosure.

Referring now to FIG. 3, a functional block diagram of an exemplary base station 300, implemented by the wireless communication network 100 of FIG. 1 for managing handover decisions while maintaining QoS of active user application sessions is illustrated, in accordance with some embodiments of the present disclosure. As stated above, in some embodiments, the base station may be a next generation NodeB (gNB). The base station may include a Radio Resource Control (RRC) 301, a Radio Resources Management (RRM) 302, a Handover Module (HOM) 303, Packet Data Convergence Protocol (PDCP) 304, and a Radio Link Control (RLC) 305.

The RRC 301 may be interconnected with the HOM 303. It may be noted that the RRC 301 may perform various operations including establishing connection and release functions, broadcasting system information, establishing radio bearer, RRC connection mobility procedures, paging notification and release and outer loop power control, configuring user and control planes based on network status and allowing RRM strategies to be implemented. Further, the RRM 302 may be interconnected with the HOM 303. It may be noted that the RRM 302 may include a set of management strategies for controlling parameters such as transmit power, user allocation, beamforming, data rates, handover criteria, modulation scheme, error coding scheme, and the like. The HOM 303 may perform the HO upon receiving a HO triggering information from the RRC 301 and the RRM 302. In some scenarios, the SgNB 212 may send the HO request to the MSS 214. In some embodiments, the PDCP 304 and the RLC 305 may provide data transfer and ciphering assistance to the RRC 301.

As will be appreciated by one skilled in the art, a variety of processes may be employed for managing handover decisions while maintaining QoS of active user application sessions in a wireless network. For example, the wireless network and the associated core network 200 and base station 300 may manage handover decisions while maintaining QoS of active user application sessions by the processes discussed herein. In particular, as will be appreciated by those of ordinary skill in the art, control logic and/or automated routines for performing the techniques and steps described herein may be implemented by the wireless network 100 and the associated core network 200 and base station 300 either by hardware, software, or combinations of hardware and software. For example, suitable code may be accessed and executed by the one or more processors on the associated core network 200 and base station 300 to perform some or all of the techniques described herein. Similarly, application specific integrated circuits (ASICs) configured to perform some or all of the processes described herein may be included in the one or more processors on the associated core network 200 and base station 300.

Figure 4:
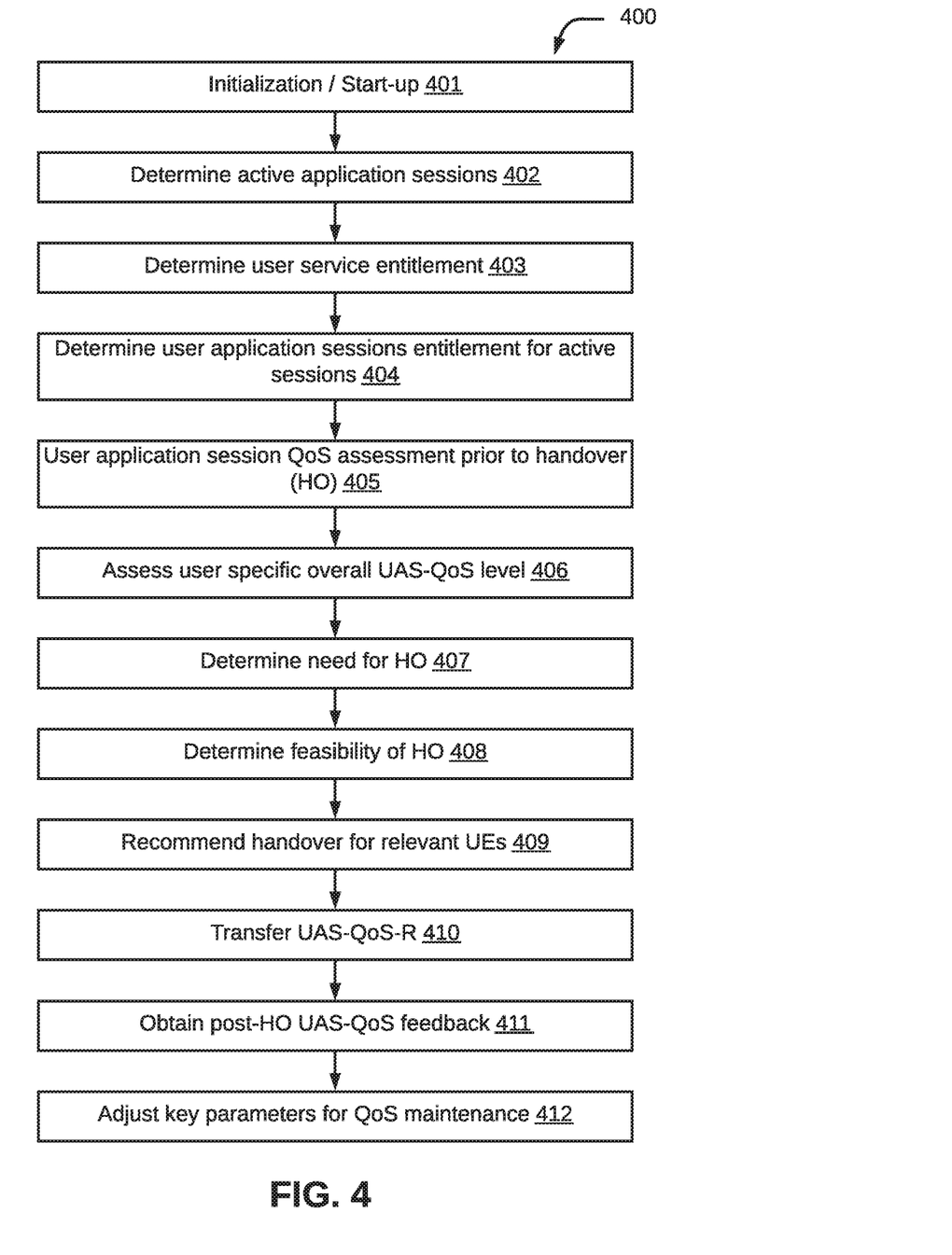
FIG. 4 is a flow diagram of an exemplary process overview for managing handover decisions while maintaining QoS of active user application sessions in a wireless network, in accordance with some embodiments of the present disclosure.

Referring now to FIG. 4, an exemplary process overview for managing handover decisions while maintaining quality-of-service (QoS) of active user application sessions in a wireless network is depicted via a flowchart, in accordance with some embodiments of the present disclosure. As will be appreciated, various steps of the process 400 are performed by various modules or components present within the access network 200 and the base station 300 of FIG. 2 and FIG. 3 respectively.

At step 401, the handover module (HOM) 303 may be initialized with configuration parameters. The HOM 303 may receive configuration parameters (e.g., Threshold QoS at Target gNB(QoSNBS$_{th}$), Handover Timer (Timer$_{handover}$), Threshold RSRP (RSRP$_{th}$), Threshold QoS at Source gNB (QoSSBS$_{th}$), Weight factor for RSRP (RSRP$_{weight}$), Weight factor for Applications (Appl$_{weight}$), etc.) from management application residing in management subsystem (MSS). The HOM 303 may then configure itself with receive parameters, Additionally, the HOM 303 may store a local copy of the received configuration parameters in a local memory.

In case there is any change in the configuration, the HOM 303 may receive configuration information of gNB from the management application through a communication interface (MA-HOM). In particular, the HOM 303 may take latest configuration parameters (e.g., Threshold data service at Target gNB(QoSNBS$_{th}$), Handover Timer (Timer$_{handover}$), Threshold RSRP (RSRP$_{th}$), Threshold data at Source gNB (QoSSBS$_{th}$), Weight factor for RSRP (RSRP$_{weight}$), Weight factor for Applications (Appl$_{weight}$) etc.) from the management application. The HOM 303 may then configure itself with the latest HOM parameters. The HOM 303 may further store a local copy of the latest configuration parameters in the local memory.

In case there is no change in the configuration, the HOM 303 may load local configuration (LC) parameters (e.g., Threshold data service at Target gNB(QoSNBS$_{th}$), Handover Timer (Timer$_{handover}$), Threshold RSRP (RSRP$_{th}$), Threshold data at Source gNB (QoSSBS$_{th}$), Weight factor for RSRP (RSRP$_{weight}$), Weight factor for Applications (Appl$_{weight}$), etc.) from the local memory for configuring itself.

At step 402, the AMF module 205 may determine active application sessions. The AMF module may include an Access Agnostic Interface Decoding (AAID) module to send or receive message from or to gNB. The AAID module may decode the received message and encode the message for sending to the gNB. The AAID module may receive measurement report and application information from the gNB. In particular, the AAID module may decode currently established active application information at SgNB 212. The AAID module may then extract the QoS for different active applications from the received messages.

In some embodiments, the AAID module may perform following steps to retrieve application QoS information:
    a. HOM determines the list of UE connected to SgNB as UEList
    b. For each $i^{th}$ UE in UEList
    c. Determine active application list ApplList(i)
    d. Determine the received RSRP from UE RSRP(i)
    e. For each $j_{th}$ application in ApplList(i)
    f. Extract current QoS of each application QoS$_{Curr}$ running on a application Store data thoughput for each application as QoS$_{Curr}$
    g. If QoS$_{Curr}$(j, i)<=QoSSBS$_{th}$ then store QoS$_{Curr}$ (j, i) for each application
        Where j varies between (1 . . . Num(ApplList)) and i varies between (1 . . . Num(ApplList))
    h. Repeat step (e)
    i. Repeat step (b)

At step 403, the PCF module 207 may determine user service entitlement. The PCF module 207 may determine the user entitlement for each application of a UE for applying QoS. In some embodiments, the PCF module 207 may perform following steps to determine user service entitlement:
    a. For each $i_{th}$ UE connected to SgNB as UEList
    b. For each $j_{th}$ application in ApplList
    c. Policy enforment module determines application entitlement Appl$_{Entl}$(j)
    d. Store each user entitlement as UE$_{Entl}$(i,j)
    e. Repeat step (a) for each UE At step 404, the SMF module 206 may determine user application sessions entitlement for active sessions. In some embodiments, the SMF module 206 may perform following steps to determine user application sessions entitlement for active sessions:
    a. For each $i_{th}$ UE in UEList
    b. Receive application entitlement list Appl$_{Entl}$(j)
    c. For each $j_{th}$ application entitlement in Appl$_{Entl}$(j)
    d. Session Lifecycle module in SMF determines the application sesion as Appl$_{Sess}$
    e. Map each application entitlement with applications session Appl$_{Sess}$ as Map<Appl$_{Sess}$(j), Appl$_{Entl}$(j)
    f. Store each map of user entitlement and applications as UE$_{Entl}$(i,j)
    g. Repeat step (c) for each application
    h. Repeat step (a) for each UE At step 405, a QoS module residing in the PCF module 207 may perform user application session QoS assessment prior to handover (HO). In some embodiments; the OoS module may perform following steps to assess user application session QoS:
    a. For each $i_{th}$ UE in UEList
    b. For each $i_{th}$ application entitlement in Appl$_{Entl}$(j)
    c. QoS module estimates QoS for each application required to maintain session as Appl$_{QoS}$(j)
    d. QoS module monitors QoS for each application required to maintain session
    e. Determine the current monitored QoS as Appl$_{CurrQoS}$(j)
    f. Store each user estimated QoS UE$_{EstQoS}$(i,Appl$_{QoS}$(j))
    g. Repeat step (a) for each UE At step 406, the QoS module residing in the PCF module 207 may assess user specific overall UAS-QoS level. In some embodiments, the QoS module may perform following steps to assess user specific overall UAS-QoS level:
    a. For each $i_{th}$ UE in UEList
    b. For each $j_{th}$ application entitlement in Appl$_{Entl}$(j)
    c. Receive estimated QoS for each application from UE$_{QoS}$(i,Appl$_{QoS}$(j))
    d. Receive current QoS for each application from UE$_{CurrQoS}$(i,Appl$_{QoS}$(j))
    e. Algorithm module determines application's overall QoS from Appl$_{TotQoS}$(j)
    f. Store each user QoS UE$_{TotQoS}$(i,Appl$_{TotQoS}$(j))
    g. Repeat step (a) for each UE At step 407, the HOM module 303 may determine a need for handover (HO). In some embodiments, the HOM module 303 may perform following steps to determine the need for HO:
    a. For each $i_{th}$ UE in UEList
    b. For each $j_{th}$ application entitlement in Appl$_{Entl}$(j)

c. Mobility module receives overall QoS for each appl from $UE_{TotQoS}(i, Apph_{TotQoS}(j))$
d. Check if $UE_{TotQoS}(i, Appl_{TotQoS}(j)) < QoSNBS_{th}$
e. Check if $RSRP(i) < RSRP_{th}$ (Threshold RSRP)
f. If both (d) and (e) true then consider that HO is required for that applications
g. Store each applications for HO need as $UE_{HO}(i, Appl_{TotQoS}(j))$
h. Repeat step (a) for each UE At step 408, the HOM module 303 may determine a feasibility of handover (HO). In some embodiments, the HOM module 303 may perform following steps to determine the feasibility of the HO to a TgNB 213:
a. For each $i_{th}$UE in UEList
b. For each $j_{th}$ application entitlement in $Appl_{Entl}$
c. Receive HO needs for an from $UE_{HO}(i, Appl_{totqos}(j))$
d. XnAP receives Network Load ($SBS_{NL}$), RL failure ($SBS_{RLF}$), HO failure ($SBS_{HOF}$) from target gNB
e. RLC module determines RLF of the UE
f. HO module determines HO success potentiality based on NL, RLF, HOF
g. HO module determines HO timer for RLF as $RLF_{FailTimer}$
h. Mobility module determines if $RLF_{FairlTimer} > Timer_{handover}$.
i. If true then consider that UE handover is required
j. Check the HO acceptibility of UE in target gNB from source gNB as $HO_{acc}$
k. Determine Feasibility of HO as $HO_{Feas}(i) = Func(SBS_{NL}, SBS_{RLF}, SBS_{HOF}, HO_{acc})$
l. Check is $HO_{Feas}(i) > HO_{FeasTh}$ where $HO_{FeasTh}$ is threshold value for considering HO feasibility
m. If true then consider that HO is feasible to initiate for execution
n. Store each UE for HO feasiblity as $UEHo_{Feas}(i)$
o. Repeat step (a) for each UE At step 409, the HOM module 303 may recommend handover (HO) for relevant or impacted UEs. In some embodiments, the HOM module 303 may perform following steps to recommend the HO:
a. For each $i_{th}$UE in UEList
b. Receive HO feasiblity information from $UE_{HOFeas}(i)$
c. Mobility module determines the UE to be initiated for HO
d. Store the handed over UE as $UEHO_{init}(i)$
e. HO module initiates HO for the UE to NBS
f. Determine the successful HO UE as $UEHO_{Succ}(i)$
g. Determine the failed HO UE as $UEHO_{Fail}(i)$
h. Repeat step (a) for each UE At step 410, the HOM module 303 may transfer the required QoS for each application session of a user (UAS-QoS-R). In some embodiments, the HOM module 303 may perform following steps to transfer the UAS-QoS-R:
a. For each $i_{th}$UE in UEList
b. Receive UE application session information from $UE_{Entl}(i,j)$
c. Receive application QoS information from $UE_{TotQoS}(i, Appl_{TotQoS}(j))$
d. Prepare UE specific QoS and session context UE (QoS, Session)
e. Transfer UE (QoS, Session) information to NBS for application session establishment
f. Repeat step (a) for each UE At step 411, the HOM module 303 may obtain UAS-QoS feedback after the handover (HO). In some embodiments, the HOM module 303 may perform following steps to obtain the UAS-QoS feedback:

a. For each $i_{th}$UE in UEList
b. Obtain the post HO information from $UEHO_{Succ}(i)$
c. XnAP receives active application session for UE in NBS
d. Store UE specific active sessions as $UENBS_{actsess}(i)$
e. QoS module receives the current QoS for active user session
f. Determine the NBS Active session QoS as $NBS_{actQoS} * APPl_{weight}$ (Weight factor for Applications)
g. Store UE specific active sessions as $UENBS_{actQoS}(i)$
h. Repeat step (a) for each UE At step 412, the HOM module 303 may adjust key parameters for future QoS maintenance and handover decisions based on the UAS-QoS feedback. In some embodiments, the HOM module 303 may perform following steps to adjust the key parameters:
a. For each $i_{th}$UE in UEList
b. Check if the current QoS $UENBS_{actQoS}(i) > UENBS_{ThQoS}(i)$
c. Check if the current Session $UENBSUENBS_{actsess}(i) > UENBS_{ThSess}(i)$
d. HO module estimates the necessary parameters to change
e. Determine the parameters changed value
f. Repeat step (a)

Figure 5:
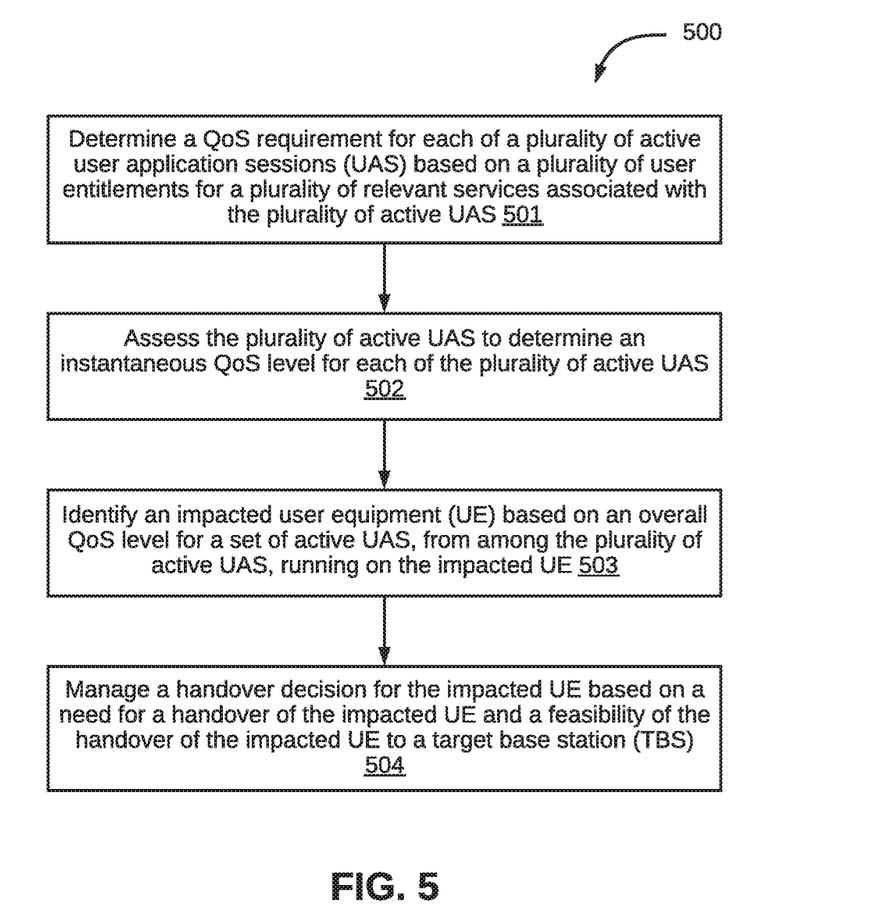
FIG. 5 is a flow diagram of an exemplary process for managing handover decisions while maintaining QoS of active user application sessions in a wireless network, in accordance with some embodiments of the present disclosure.

Referring now to FIG. 5, exemplary process 500 for managing handover decisions while maintaining QoS of active user application sessions in a wireless network is depicted via a flowchart, in accordance with some embodiments of the present disclosure. At step 501, the SBS 300 may determine a QoS requirement for each of a plurality of active user application sessions (UAS) based on a plurality of user entitlements for a plurality of relevant services associated with the plurality of active UAS. In some embodiments, the SBS 300 may determine the QoS requirement for each of the plurality of active UAS by determining the set of active UAS running on a UE, determining a user entitlement for a set of relevant services associated with the set of active UAS, mapping the set of active UAS to the set of relevant services, and determining the QoS requirement for each of the set of active UAS based on the user entitlement for the set of relevant services and the mapping, Each of these steps/sub-steps is described in greater detail in steps 402, 403, and 404 discussed above. Further, it should be noted that the SBS 300 may work in conjunction with the PCF module 207 in the core network 200 to perform these steps/sub-steps.

At step 502, the SBS 300 may assess the plurality of active UAS to determine an instantaneous QoS level for each of the plurality of active UAS. At step 503, the SBS 300 may identify an impacted user equipment (UE) based on an overall QoS level for a set of active UAS, from among the plurality of active UAS, running on the impacted UE. It should be noted that the overall QoS level is based on the instantaneous QoS level and the QoS requirement for each UAS in the set of active UAS. At step 505, the SBS 300 may manage a handover decision for the impacted UE based on a need for a handover of the impacted UE and a feasibility of the handover of the impacted UE to a TBS. In some embodiments, the SBS 300 may further determine the need for the handover of the impacted UE in the SBS 300 based on the overall QoS level for the set of active UAS running on the impacted UE and a required overall QoS level. Each of these steps/sub-steps is described in greater detail in steps 405, 406, and 407 discussed above. Further, it should be noted that the SBS 300 may work in conjunction with the SMF module 206 and the PCF module 207 in the core network 200 to perform these steps/sub-steps.

Additionally, in some embodiments, the SBS 300 may further determine the feasibility of the handover of the impacted UE to the TBS by determining the TBS based on a set of predefined selection criteria, and determining a success score for the handover from the SBS 300 to the TBS based on historical data. In such embodiments, the SBS 300 may further recommend the handover of the impacted UE to the TBS in order to maintain the QoS requirement of each UAS in the set of UAS. Each of these steps/sub-steps is described in greater detail in steps 408, and 409 discussed above.

Moreover, in some embodiments, the SBS 300 may perform the handover of the impacted UE from the SBS 300 to the TBS based on the need for the handover and the feasibility of the handover. It should be noted that, in some embodiments, the SBS 300 may perform the handover by transferring the QoS requirement and the instantaneous QoS level for each of the set of active UAS running on the impacted UE from the SBS to the TBS. Moreover, in some embodiments, the SBS may further receive, from the TBS, a post-handover instantaneous QoS data for each of the set of active UAS running on the impacted UE. It should be noted that the post-handover instantaneous QoS data are acquired or determined by the TBS. In such embodiments, the SBS may further adjust a set of parameters for determining a feasibility of a future handover based on the post-handover instantaneous QoS data. Each of these steps/sub-steps is described in greater detail in steps 410, 411, and 412 discussed above. Further, it should be noted that the SBS 300 may work in conjunction with the UPF module 209 in the core network 200 and the TBS in the access network to perform these steps/sub-steps.

As will be appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. The disclosed methods and systems may be implemented on a conventional or a general-purpose computer system, such as a personal computer (PC) or server computer.

As will be appreciated by those skilled in the art, the techniques described in the various embodiments discussed above provide for managing user application level quality-of-service aware handover in wireless network. In particular, the techniques provide for managing handover decisions while maintaining QoS of active user application sessions in a wireless network. For example, the techniques provide for determining a need for a handover and a feasibility of the handover. Additionally, the techniques provide for performing the handover based on the need and the feasibility. Further, the techniques provide for receiving a feedback (post-handover instantaneous QoS data) and adjusting parameters for determining the feasibility of a future handover. The techniques, therefore, provide a service architecture for 5G wireless communication.

The specification has described a method and system for managing handover decisions while maintaining quality-of-service (QoS) of active user application sessions in a wireless network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed, Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored, Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing handover decisions while maintaining quality-of-service (QoS) of active user application sessions in a wireless network, the method comprising:
   determining, by a source base station (SBS), a QoS requirement for each of a plurality of active user application sessions (UAS) based on a plurality of user entitlements for a plurality of relevant services associated with the plurality of active UAS;
   assessing, by the SBS, the plurality of active UAS to determine an instantaneous QoS level for each of the plurality of active UAS;
   identifying, by the SBS, an impacted user equipment (UE) based on an overall QoS level for a set of active UAS, from among the plurality of active UAS, running on the impacted UE, wherein the overall QoS level is based on the instantaneous QoS level and the QoS requirement for each UAS in the set of active UAS; and
   managing, by the SBS, a handover decision for the impacted UE based on a need for a handover of the impacted UE and a feasibility of the handover of the impacted UE to a target base station (TBS).

2. The method of claim 1, wherein determining the QoS requirement for each of the plurality of active UAS comprises:
   determining the set of active UAS running on a UE;
   determining a user entitlement for a set of relevant services associated with the set of active UAS;
   mapping the set of active UAS to the set of relevant services; and
   determining the QoS requirement for each of the set of active UAS based on the user entitlement for the set of relevant services and the mapping.

3. The method of claim 1, further comprising determining the need for the handover of the impacted UE in the SBS based on the overall QoS level for the set of active UAS running on the impacted UE and a required overall QoS level.

4. The method of claim 1, further comprising determining the feasibility of the handover of the impacted UE to the TBS by:
   determining the TBS based on a set of predefined selection criteria; and
   determining a success score for the handover from the SBS to the TBS based on historical data.

5. The method claim 1, wherein managing the handover decision comprises performing the handover of the impacted UE from the SBS to the TBS based on the need for the handover and the feasibility of the handover.

6. The method of claim 5, wherein performing the handover comprises transferring the QoS requirement and the instantaneous QoS level for each of the set of active UAS running on the impacted UE from the SBS to the TBS.

7. The method of claim 5, wherein managing the handover decision comprises:
   receiving, from the TBS, a post-handover instantaneous QoS data for each of the set of active UAS running on the impacted UE, wherein the post-handover instantaneous QoS data are acquired or determined by the TBS; and
   adjusting a set of parameters for determining a feasibility of a future handover based on the post-handover instantaneous QoS data.

8. A wireless network for managing handover decisions while maintaining quality-of-service (QoS) of active user application sessions, the wireless network comprising:
   a source base station (SBS) and a target base station (TBS), each communicatively coupled to a core network, wherein the SBS is configured to:
      determine a QoS requirement for each of a plurality of active user application sessions (UAS) based on a plurality of user entitlements for a plurality of relevant services associated with the plurality of active UAS;
      assess the plurality of active UAS to determine an instantaneous QoS level for each of the plurality of active UAS;
      identify an impacted user equipment (UE) based on an overall QoS level for a set of active UAS, from among the plurality of active UAS, running on the impacted UE, wherein the overall QoS level is based on the instantaneous QoS level and the QoS requirement for each UAS in the set of active UAS; and
      manage a handover decision for the impacted UE based on a need for a handover of the impacted UE and a feasibility of the handover of the impacted UE to the TBS.

9. The wireless network of claim 8, wherein the SBS is configured to determine the QoS requirement for each of the plurality of active UAS by:
   determining the set of active UAS running on a UE;
   determining a user entitlement for a set of relevant services associated with the set of active UAS;
   mapping the set of active UAS to the set of relevant services; and
   determining the QoS requirement for each of the set of active UAS based on the user entitlement for the set of relevant services and the mapping.

10. The wireless network of claim 8, wherein the SBS is further configured to determine the need for the handover of the impacted UE in the SBS based on the overall QoS level for the set of active UAS running on the impacted UE and a required overall QoS level.

11. The wireless network of claim 8, wherein the SBS is further configured to determine the feasibility of the handover of the impacted UE to the TBS by:
   determining the TBS based on a set of predefined selection criteria; and
   determining a success score for the handover from the SBS to the TBS based on historical data.

12. The wireless network of claim 8, wherein the SBS is further configured to perform the handover of the impacted UE from the SBS to the TBS based on the need for the handover and the feasibility of the handover.

13. The wireless network of claim 12, wherein the SBS is configured to perform the handover by transferring the QoS requirement and the instantaneous QoS level for each of the set of active UAS running on the impacted UE from the SBS to the TBS.

14. The wireless network of claim 12, wherein the SBS is further configured to:
   receive, from the TBS, a post-handover instantaneous QoS data for each of the set of active UAS running on the impacted UE, wherein the post-handover instantaneous QoS data are acquired or determined by the TBS; and
   adjust a set of parameters for determining a feasibility of a future handover based on the post-handover instantaneous QoS data.

15. A non-transitory computer-readable medium storing computer-executable instructions for:
   determining a quality-of-service (QoS) requirement for each of a plurality of active user application sessions (UAS) based on a plurality of user entitlements for a plurality of relevant services associated with the plurality of active UAS;
   assessing the plurality of active UAS to determine an instantaneous QoS level for each of the plurality of active UAS;
   identifying an impacted user equipment (UE) based on an overall QoS level for a set of active UAS, from among the plurality of active UAS, running on the impacted UE, wherein the overall QoS level is based on the instantaneous QoS level and the QoS requirement for each UAS in the set of active UAS; and
   managing a handover decision for the impacted UE based on a need for a handover of the impacted UE at a source base station (SBS) and a feasibility of the handover of the impacted UE to a target base station (TBS).

16. The non-transitory computer-readable medium of claim 15, wherein determining the QoS requirement for each of the plurality of active UAS comprises:

determining the set of active UAS running on a UE;

determining a user entitlement for a set of relevant services associated with the set of active UAS;

mapping the set of active UAS to the set of relevant services; and determining the QoS requirement for each of the set of active UAS based on the user entitlement for the set of relevant services and the mapping.

17. The non-transitory computer-readable medium of claim 15, further toring computer-executable instructions for at least one of:

determining the need for the handover of the impacted UE in the SBS based on the overall QoS level for the set of active UAS running on the impacted UE and a required overall QoS level; and determining the feasibility of the handover of the impacted UE to the TBS, wherein determining the feasibility comprises:

determining the TBS based on a set of predefined selection criteria; and determining a success score for the handover from the SBS to the TBS based on historical data.

18. The non-transitory computer-readable medium of claim 15, further storing computer-executable instructions for:

performing the handover of the impacted UE from the SBS to the TBS based on the need for the handover and the feasibility of the handover, wherein performing the handover comprises transferring the QoS requirement and the instantaneous QoS level for each of the set of active UAS running on the impacted UE from the SBS to the TBS.

19. The non-transitory computer-readable medium of claim 18, further storing computer-executable instructions for:

receiving, from the TBS, a post-handover instantaneous QoS data for each of the set of active UAS running on the impacted UE, wherein the post-handover instantaneous QoS data are acquired or determined by the TBS; and adjusting a set of parameters for determining a feasibility of a future handover based on the post-handover instantaneous QoS data.

* * * * *